United States Patent [19]

Genovese

[11] 4,020,581
[45] May 3, 1977

[54] EYELESS FISHING ROD

[76] Inventor: Nunzio Genovese, 6703 Balsam Drive, Bedford Hts., OhioIO 44146

[22] Filed: Oct. 20, 1975

[21] Appl. No.: 623,671

[52] U.S. Cl. ............................ 43/18 GF; 43/22; 43/23; 43/24
[51] Int. Cl.² ................. A01K 87/00; A01K 87/06
[58] Field of Search ............... 43/18 R, 18 GF, 22, 43/23, 24

[56] References Cited

UNITED STATES PATENTS

| | | | |
|---|---|---|---|
| 2,334,646 | 11/1943 | Price | 43/18 R |
| 2,729,012 | 1/1956 | Lee | 43/18 R |
| 2,830,399 | 4/1958 | Davis | 43/23 |
| 2,955,376 | 10/1960 | Zeigler | 43/22 |
| 3,279,116 | 10/1966 | Chapman | 43/23 |

FOREIGN PATENTS OR APPLICATIONS 1,374,960  9/1964  France .................................. 43/24

Primary Examiner—Louis G. Mancene
Assistant Examiner—Daniel J. Leach
Attorney, Agent, or Firm—Donnelly, Maky, Renner & Otto

[57] ABSTRACT

A fishing rod including an elongated, hollow, generally tapered cylindrical rod portion comprised of a plurality of blanks having their ends telescopingly connected to each other, and a holder portion to which a reel is mounted and including a universal guide for guiding fishing line from reels of different sizes into the hollow of the rod portion with a minimum amount of rubbing friction against the line and without exposing the line to any sharp edges that might cut the line or cause the same to bind. The reel is secured to the holder portion by an over-center cam lock mechanism which urges a rigid plate with resilient cover strip into tight clamping engagement with the reel base mounting plate sandwiching the latter against the resilient cover strip and a wall portion of the holder.

10 Claims, 6 Drawing Figures

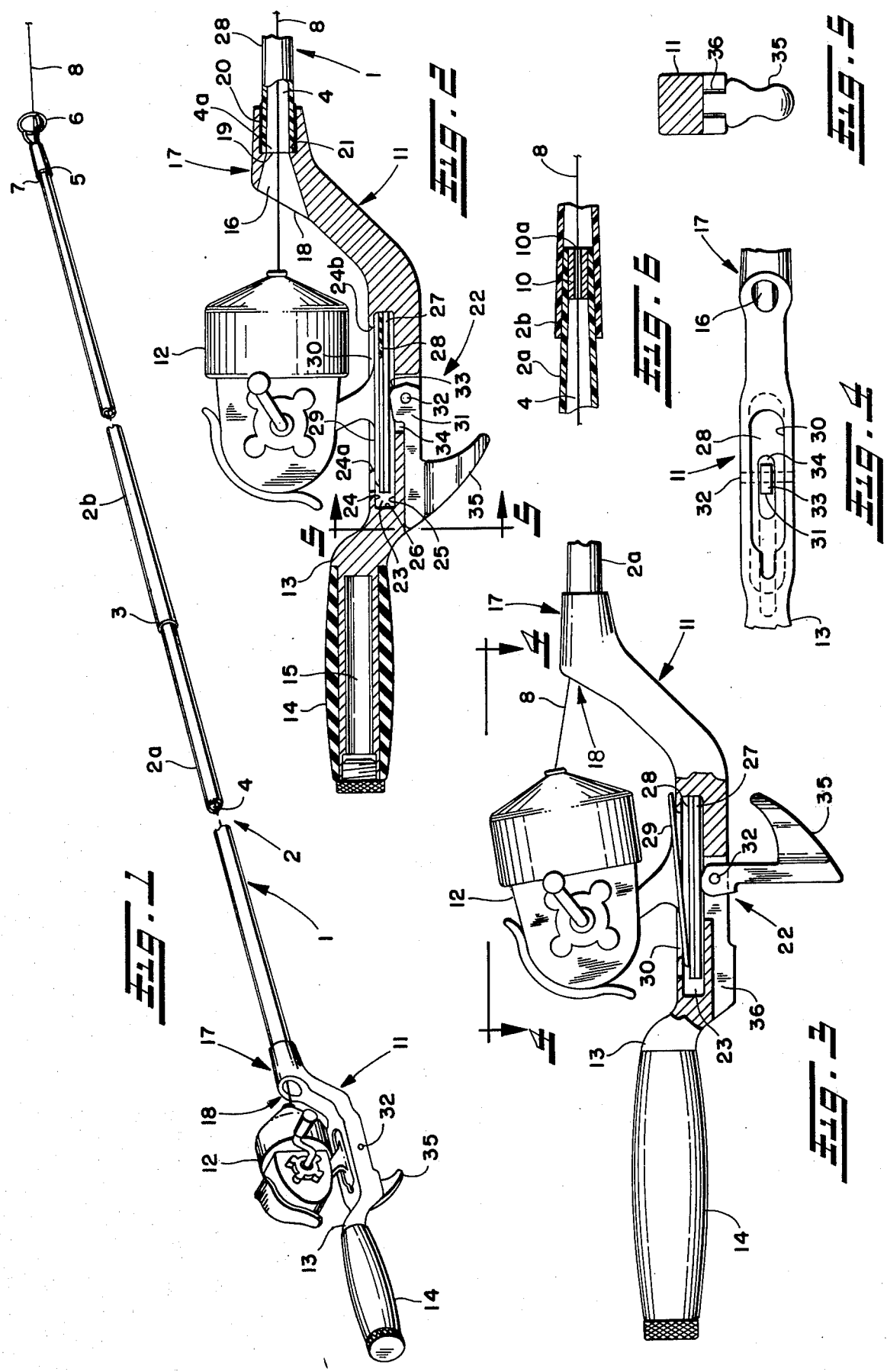

EYELESS FISHING ROD

BACKGROUND OF THE INVENTION

The present invention is directed to eyeless fishing rods and to reel mounting mechanisms therefor which provide for straight line passage of the fishing line from reels of various sizes through the center of the rod while eliminating any direct contact of the fishing line with any sharp or even slightly tapered smooth guiding surfaces. Whenever fishing line contacts a sharp surface or rubs against a smooth surface in a fishing rod, there is an undesirable drag on the line, which may cause the line to become bunched up, snagged, caught, or even broken. The reel mounting mechanism includes a cam locking arrangement which also eliminates movement or wobble of the reel base mounting plate when secured in the holder portion of the fishing rod, and permits ready removal and attachment of various sizes and types of reels thereto.

SUMMARY OF THE INVENTION

The eyeless fishing rod of the present invention has a cone-like passage for guiding fishing line from reels of different sizes to the hollow passageway in the tubular rod portion in order to eliminate any sharp edges which might otherwise be contacted by the fishing line and to minimize the amount of rubbing contact between the fishing line and the fishing rod. A bushing located near the juncture of the elongate, hollow, generally tapered cylindrical telescoping blanks which comprise the tubular rod portion of such eyeless fishing rod further facilitates centering of the fishing line in the rod and reduces the possibility of the line hang up or snagging within the rod portion, even when water enters the latter. The locking mechanism for the reel comprises a substantially rigid plate disposed in a cavity formed in the holder portion of the fishing rod having a resilient strip covering the upper surface thereof for clamping engagement with the base mounting plate of a reel inserted in the cavity when urged thereagainst by rotation of an over-center cam device to the lock position.

With the foregoing in mind, it is a primary object of the invention to provide a novel eyeless fishing rod of the type described.

Another object is to provide for secure locking of a reel in the holder portion of the fishing rod.

Still another object is to reduce the stress applied to portions of a fishing rod holder at the reel locking part thereof.

A further object is to reduce the possibility of encountering snags or the like in the fishing line passing through an eyeless fishing rod.

Yet another object is to provide a universal guide for directing fishing line from different size reels mounted on a fishing rod through the eyeless, tubular rod portion thereof with a minimum of abutment or contact between the fishing line and the walls of the fishing rod.

These and other objects and advantages of the invention will become more apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a perspective view of a preferred form of eyeless fishing rod constructed in accordance with the present invention;

FIG. 2 is an enlarged view mostly in section of the holder portion of the fishing rod of FIG. 1;

FIG. 3 is an enlarged view, partly in section of the holder portion of the fishing rod, similar to FIG. 2, but depicting the method of securing the reel to the fishing rod;

FIG. 4 is a top plan view of part of the fishing rod holder portion looking in the direction of the arrows 4—4 of FIG. 3;

FIG. 5 is a section view of the holder portion of the fishing rod looking in the direction of arrows 5—5 of FIG. 2; and FIG. 6 is a section view of the connection between two rod blanks, with a bushing liner at the end of one of the cylindrical blanks of the eyeless fishing rod.

DESCRIPTION OF THE PREFERRED EMBODIMENT

Referring now more particularly to the drawing, wherein like reference numerals designate like parts in the several figures, the eyeless fishing rod of the invention is generally designated at 1 in FIG. 1. The fishing rod 1 includes an elongated rod portion 2 comprised of two, or more if desired, elongate, hollow, generally tapered cylindrical blanks 2a, 2b connected together in telescoping fashion at 3 to form a generally cylindrical, elongated tube having an internal passageway 4. Each of the blanks 2a, 2b may be formed of fiberglass or other suitable material, and a cylindrical mount 5, for example, of stainless steel, with eye 6 may be slipped over the tip 7 of the outermost blank 2b to prevent the fishing line 8 from dragging against the edge of the passageway 4 at the outer end of the outermost blank 2b. The cylindrical mount 5 may be cemented or otherwise fastened to the outermost blank 2b so that the smooth toroidal eye 6 may be used to guide the line 8 extending through the internal passageway 4 as shown.

Each of the blanks 2a, 2b may be tapered with the outer ends of each blank of smaller diameter than their inner ends, and so designed that the smaller end of the innermost blank 2a may be telescopingly received in the larger end of the next blank 2b to provide a relatively strong, telescope-like connection therebetween. A bushing 10 having a central longitudinal passage 10a therethrough is also preferably glued or otherwise retained within the outermost end of the internal passageway in the blank 2a, as well as in any succeeding blanks, as shown in FIG. 6, to guide the fishing line between adjacent blanks. The bushing 10 may be formed of nylon, for example, and its principal function is to center the fishing line in the rod and to preclude the fishing line from laying against the walls of the blanks where it might become hung up or snagged, especially if water has entered the hollow tube passageway 4 of the rod portion 2.

The fishing rod 1 also has a holder portion 11 on which a conventional reel 12 may be mounted and secured firmly in position. A handle 13 on the holder portion 11 may include bicycle-type hand grip 14 or the like, and the handle 13 also may be hollow and accessible by removal of the hand grip 14 or a cover thereon to provide a dry storage area 15 for limited storage of flies, hooks and other fishing gear and the like.

The holder portion 11 is preferably formed as a single-piece aluminum die casting having a truncated conical or oval funnel-shape guide passage 16 through a coupling portion 17 thereof to the first blank 2a. The guide passage 16 directs or guides the fishing line 8 from the reel 12 into the passageway 4 in the first blank 2a, and includes an enlarged entrance opening 18 facing the reel 12 to receive line from reels of different sizes without presenting any sharp edges or corners to the line as it enters the guide passage. The vertical dimension of the entrance opening at its widest point is desirably approximately 1 inch and the horizontal dimension at its widest point is desirably approximately ½ inch. From its entrance 18 the guide passage 16 tapers down smoothly to a smaller cross-section exit opening 19 of preferably circular shape and of substantially the same size as the entrance opening 4a to the passageway 4 through the innermost blank 2a, which may be approximately ½ inch in diameter. A cylindrical opening 20 is also provided in the coupling portion 17, which meets the guide passage 16 at an annular shoulder 21 for receipt of the inner end of the blank 2a, which abuts against the shoulder 21. The blank 2a is preferably permanently secured to the holder in the opening 20 by cementing the same in place, and when thus positioned, there is a smooth transition between the guide passage 16 and the entrance 4a to the passageway 4 of the blank 2a, as best shown in FIG. 2.

Due to the relatively large angle of taper or sidewall to axis angle in the guide passage 16 formation, the guide passage assumes a universal-like function to direct fishing line from reels of different sizes into the rod portion of the fishing rod with a minimum of surface abutment and rubbing friction with the fishing line. Also, because the guide passage exit opening 19 terminates directly into the passageway 4 in the blank 2a, which abuts the shoulder 21, the transition from the guide passage to the blank 2a passageway is smooth and continuous. A suitable length of mono-wire having an eye at one end may be used to thread the fishing line through the internal passageway 4 of the end portion 2, and stored in the hollow handle 13 when not being used, as desired.

Turning now more particularly to FIGS. 2 through 5, a cam locking mechanism for securing the reel 12 to the holder portion 11 of the fishing rod 1 is generally designated at 22. The locking mechanism 22 includes a cavity 23 in the holder portion 11 defined by top, bottom and side walls 24, 25 and 26, respectively. Contained within the cavity 23 is relatively rigid locking plate 27 having a cushion strip 28 of rubber or rubber-like material glued or otherwise secured to the upper surface of the plate 27 for compressive engagement with the bottom surface of the reel base mounting plate 29 for releasably locking the plate 29 with the cavity 23 in a manner to be described. The thickness of the locking plate 27 together with its cover strip 28 is somewhat less than the depth of the cavity 23 measured from the top wall 24 to the bottom wall 25 in order to allow a conventional base support mounting plate 29 of a reel 12 to be inserted through an opening 30 in the top wall 24 into the cavity 23 for engagement with the strip 28. The dimensions of the opening 30 and cavity 23 are such as to permit the reel base mounting plate 29, which has a length greater than the length of the opening 30, to be inserted into the cavity through the opening as shown in FIG. 3 and its position adjusted so that the opposite ends of the reel base mounting plate are located beneath the portions 24a, 24b of the top wall 24 bounding the opening 30 as shown in FIG. 2. The back wall of the opening 30 may be slotted for receipt of the shaft of a milling cutter to permit undercutting of the cavity 23 therebeneath to the depth shown.

A cam 31 secured by a pivot pin 32 to the holder portion 11 of the fishing rod 1 has a cam surface portion 33 which protrudes through a slot 34 in the bottom wall 26 into the cavity 23. A trigger-like grip or actuator 35 attached to the pivotal cam 31 normally has a major extent thereof located, when in locking position, in a recess 36 formed in the body of the holder portion 11 (see FIG. 5). When the trigger actuator 35 is moved from the FIG. 2 position to its furthest counterclockwise location shown in FIG. 3, the lowest part of the cam surface portion 33 faces the cavity 23 allowing the reel base mounting plate 29 to be fully inserted into the cavity and aligned beneath the top wall portions 24a, 24b. After the reel base mounting plate 29 is so positioned in the cavity 23, the trigger actuator 35 and cam 31 may be rotated in a clockwise direction so that a relatively high part of the cam surface portion 33 urges the locking plate 27 into locking engagement with the base mounting plate 29. The resilient strip 28 contacts the base mounting plate and deforms or compresses somewhat therebeneath for good clamping retention of the base mounting plate in the cavity 23 sandwiched between the strip 28 on the locking plate 27 and the top wall 24.

During the described locking action, the resilient strip 28 on the locking plate 27 may define a raised perimeter about the perimeter of the reel base mounting plate 29 to preclude lateral motion of the latter in the cavity 23, and the compressiveness of the resilient strip 28 located directly beneath the reel mounting plate will permit slight variations in the thickness of the reel mounting plate without adversely affecting the clamping action of the locking plate 27 thereagainst as previously described. Retention of the actuator 35 and cam 31 in the locking position is obtained by making the cam 31 an over-center device, that is, by locating the highest point on the cam surface portion 33 so that it moves from left to right of the cam pivot 32 during pivoting of the cam from the unlocking position shown in FIG. 3 to the locking position shown in FIG. 2. By so constructing the cam, the cam will remain in the locked position shown in FIG. 2 until intentionally moved out of that position by counterclockwise rotation of the trigger actuator 35 to the FIG. 3 position.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A fishing rod, comprising an elongated rod portion, a holder, and means for securing said rod portion to said holder portion;

said rod portion including a plurality of hollow, elongate, generally tapered cylindrical blanks connectable together to form a tube having a longitudinal central passageway therethrough, the larger end of each tapered blank being of a size to receive a partially inserted smaller end of a different blank for secure connection therebetween, the larger end of one of said blanks being relatively permanently fastened to said holder portion;

said holder portion including means for securing a reel to the fishing rod, handle means for manual grasping of the fishing rod, and guide means for guiding fishing line from the reel into the larger end of said fastened blank, said guide means including a smooth, generally truncated conical passage means through part of said holder portion and having an enlarged entrance opening and a smaller exit opening, said entrance opening facing the reel to receive line from reels of different sizes with a relatively minimum of frictional rubbing against the line by the passage walls thereof, and said exit opening facing said fastened blank and being at least approximately the same size as the size of the entrance to the hollow interior of said fastened blank at the larger end thereof to provide a relatively smooth transition from said guide means to said rod portion also with a relatively minimum of frictional rubbing against the line; said means for securing said rod portion to said holder portion including a generally cylindrical coupling opening in said holder portion, said coupling opening being aligned with said exit opening of said guide means and joining the latter at an annular shoulder, the thickness of said annular shoulder being at least approximately the same as the thickness of said fastened blank at the larger end thereof so as to provide a smooth transition from said guide means into the internal passageway of said fastened blank.

2. A fishing rod as set forth in claim 1, further comprising a bushing in at least one of said blanks proximate the smaller end thereof at its juncture with a further blank, said bushing having a relatively reduced diameter central passageway relative to the inner diameter of the smaller end of the blank in which it is located, whereby said bushing centers the line passing through the passageway of said rod portion and prevents the line from snagging against the walls of the respective blanks at opposite ends of said bushing.

3. A fishing rod as set forth in claim 1, wherein said blanks are formed of fiberglass.

4. A fishing rod as set forth in claim 1, further comprising a metal eye located at the smaller end of the blank most remote from said holder portion, said eye having a smooth toroidal portion for guiding the line in and out of the passageway of said rod portion without wearing against the terminal end of said remote blank.

5. A fishing rod as set forth in claim 1, wherein said holder portion is made of a single piece die casting.

6. A fishing rod as set forth in claim 1, wherein said handle means is hollow and has an opening at one end covered by a removable cap providing an accessible water tight storage compartment in said holder portion.

7. A fishing rod as set forth in claim 1, wherein said means for securing the reel to the fishing rod comprises cavity means in said holder portion for receiving the base mounting plate of a reel, said cavity means including top, bottom and side walls, an entrance opening in said top wall for insertion of the base mounting plate of the reel fully into said cavity means, said cavity means of a size to permit limited movement of the base mounting plate for alignment to position simultaneously opposite ends thereof beneath respective portions of said top wall at opposite sides of said entrance opening, a movable locking plate in said cavity means, resilient cover means on the surface of said locking plate facing said entrance opening for engagement with the base mounting plate of the reel, and cams means directly engageable with said locking plate for urging said resilient cover means into tight clamping engagement with the base mounting plate when located in such aligned position forcing the latter to abutment with said top wall, thus securing the reel to said holder portion.

8. An apparatus for mounting and securing a reel to the holder portion of a fishing rod or the like, comprising:
 cavity means in said holder portion for receiving the base mounting plate of a reel, said cavity means including top, bottom and side walls, an entrance opening in said top wall for insertion of the base mounting plate fully into said cavity means, said cavity means being of a size to permit limited movement of the base mounting plate for alignment to position simultaneously opposite ends thereof beneath respective portions of said top wall at opposite sides of said entrance opening;
 a movable locking plate in said cavity means, resilient means on a surface of said locking plate for compressively engaging the base mounting plate to tightly hold the same; and
 cam means directly engageable with said locking plate for urging the latter to abut in clamping engagement the base mounting plate when located in such aligned position forcing the latter to abutment with said top wall, thus securing the reel to said holder portion.

9. An apparatus as set forth in claim 8, said cam means including a support securing the same to said holder portion, said cam means being pivotable about said support on an axis substantially perpendicular to the major linear extent of the fishing rod, and triggerlike means actuatable from the exterior of said holder portion on a side thereof opposite to that at which the reel is secured for rotating said cam means on such axis.

10. An apparatus as set forth in claim 9, said cam means including an over-center cam surface having a highest point relative to said support, said highest point being so angularly positioned on said cam surface such that upon movement of said cam means to a full locked position, said highest point is over-center relative to the pivotal axis of said support for retaining said cam means in such locked position.

* * * * *